(12) United States Patent
Rochette et al.

(10) Patent No.: US 7,519,814 B2
(45) Date of Patent: Apr. 14, 2009

(54) SYSTEM FOR CONTAINERIZATION OF APPLICATION SETS

(75) Inventors: Donn Rochette, Fenton, IA (US); Paul O'Leary, Kanata (CA); Dean Huffman, Kanata (CA)

(73) Assignee: Trigence Corp., Ottawa (CA)

( * ) Notice: Subject to any disclaimer, the term of this patent is extended or adjusted under 35 U.S.C. 154(b) by 933 days.

(21) Appl. No.: 10/939,903

(22) Filed: Sep. 13, 2004

(65) Prior Publication Data

US 2005/0060722 A1    Mar. 17, 2005

Related U.S. Application Data

(60) Provisional application No. 60/512,103, filed on Oct. 20, 2003, provisional application No. 60/502,619, filed on Sep. 15, 2003.

(51) Int. Cl.
  *G06F 3/00* (2006.01)
(52) U.S. Cl. .................. 713/167; 713/164; 709/248; 709/214; 719/319
(58) Field of Classification Search .............. 713/167; 719/319
  See application file for complete search history.

(56) References Cited

U.S. PATENT DOCUMENTS 6,381,742 B2 *   4/2002   Forbes et al. ................. 717/176

(Continued)

FOREIGN PATENT DOCUMENTS

WO    WO 02/06941 A    1/2002
WO    WO 2006/039181 A    4/2006

OTHER PUBLICATIONS

Soltesz, S., et al, 'Container-based Operating System Virtualization:A Scalable, High-performance Alternative to Hypervisors', SIGOPS Oper. Syst. Rev., vol. 41, No. 3. (Jun. 2007), pp. 275-287, entire article, http://delivery.acm.org/10.1145/1280000/1273025/p275-soltesz.pdf?key1=1273025&key2=0279528221&coll=GUIDE&dl=GUIDE&CFID=13091697& CFTOKEN=4667.*

*Primary Examiner*—Kambiz Zand
*Assistant Examiner*—Ronald Baum
(74) *Attorney, Agent, or Firm*—Allen, Dyer, Doppelt, Milbrath & Gilchrist, P.A.

(57) ABSTRACT

A system is disclosed having servers with operating systems that may differ, operating in disparate computing environments, wherein each server includes a processor and an operating system including a kernel a set of associated local system files compatible with the processor. This invention discloses a method of providing at least some of the servers in the system with secure, executable, applications related to a service, wherein the applications may be executed in a secure environment, wherein the applications each include an object executable by at least some of the different operating systems for performing a task related to the service. The method of this invention requires storing in memory accessible to at least some of the servers a plurality of secure containers of application software. Each container includes one or more of the executable applications and a set of associated system files required to execute the one or more applications, for use with a local kernel residing permanently on one of the servers. The set of associated system files are compatible with a local kernel of at least some of the plurality of different operating systems. The containers of application software exclude a kernel; and some or all of the associated system files within a container stored in memory are utilized in place of the associated local system files resident on the server.

34 Claims, 17 Drawing Sheets

U.S. PATENT DOCUMENTS 6,847,970 B2 * 1/2005 Keller et al. .............. 707/100
7,076,784 B1 * 7/2006 Russell et al. ............ 719/315
7,287,259 B2 * 10/2007 Grier et al. .............. 719/331
2002/0004854 A1 1/2002 Hartley
2002/0174215 A1 11/2002 Schaefer .................. 709/224
2003/0101292 A1 5/2003 Fisher

* cited by examiner

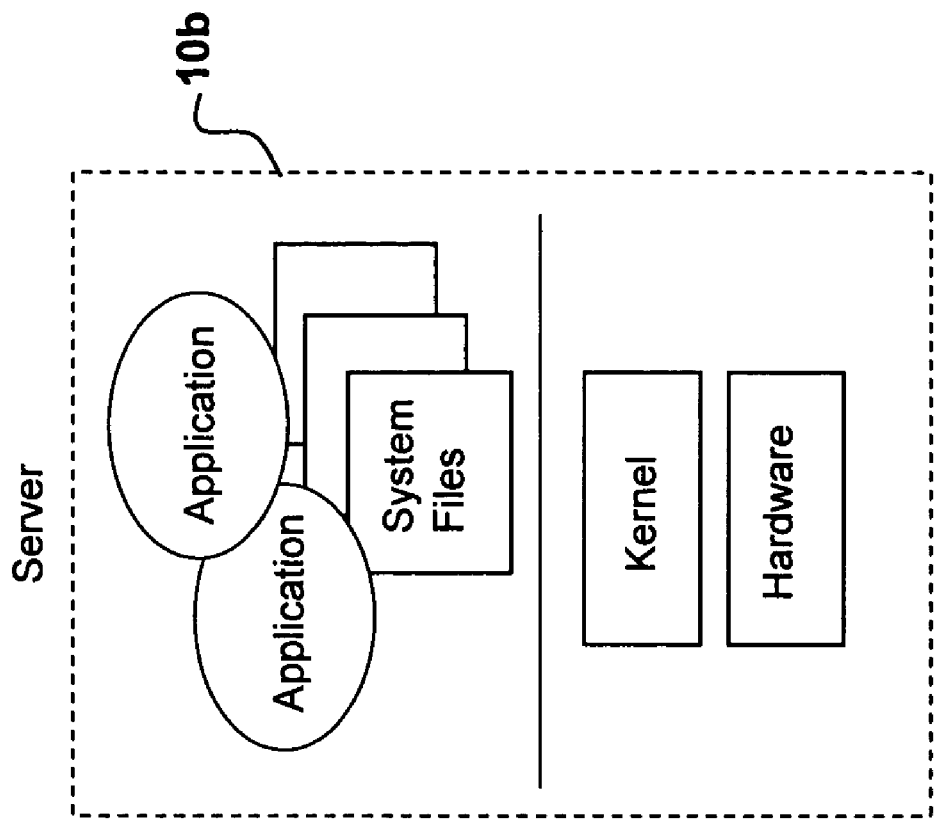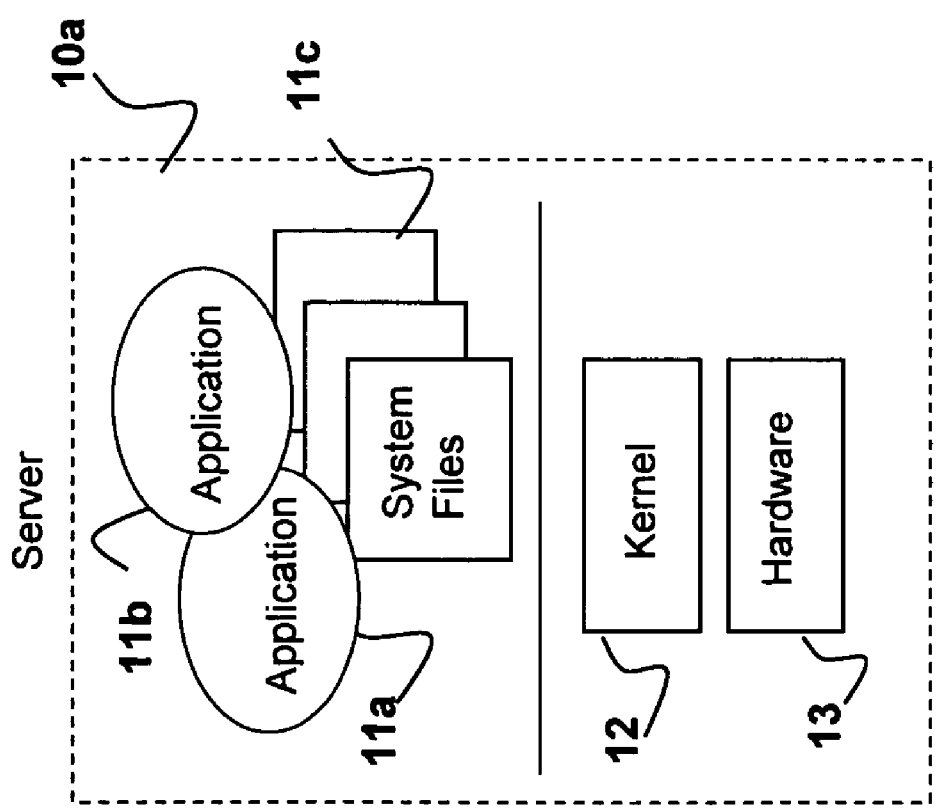
Figure 1

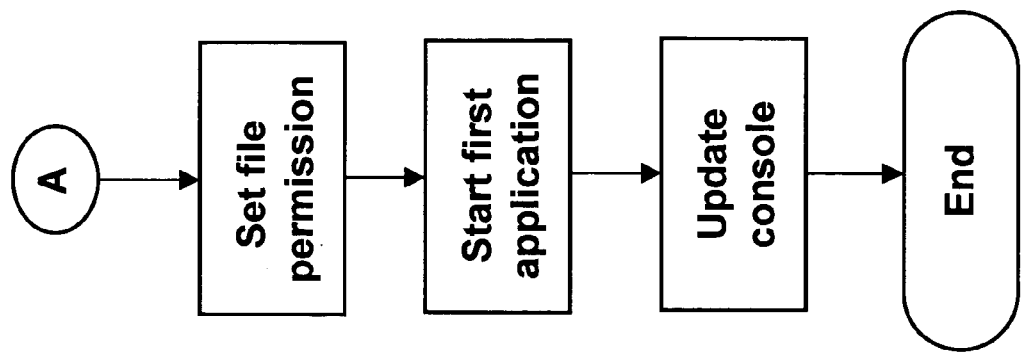
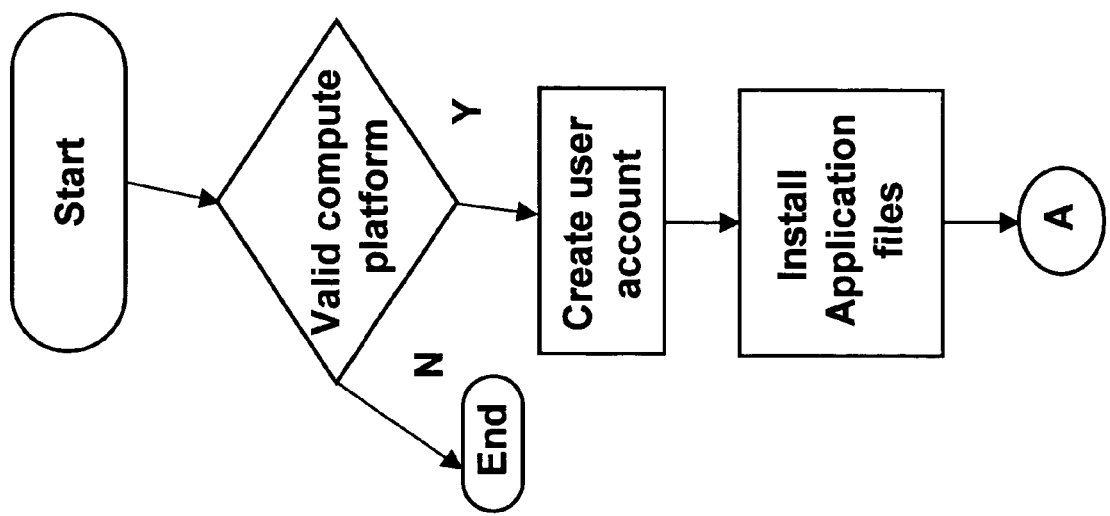
Figure 16

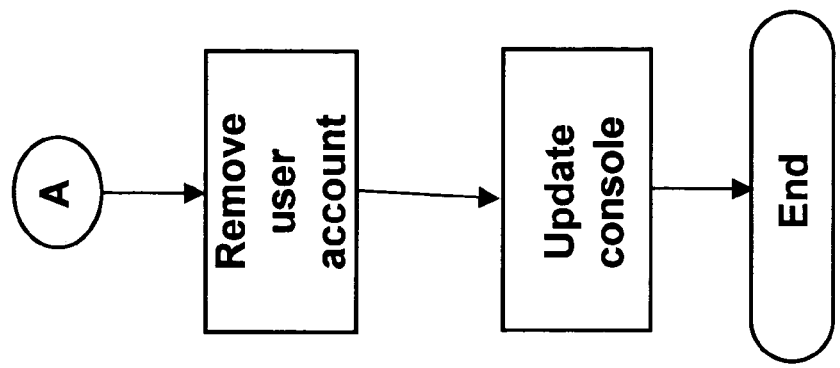
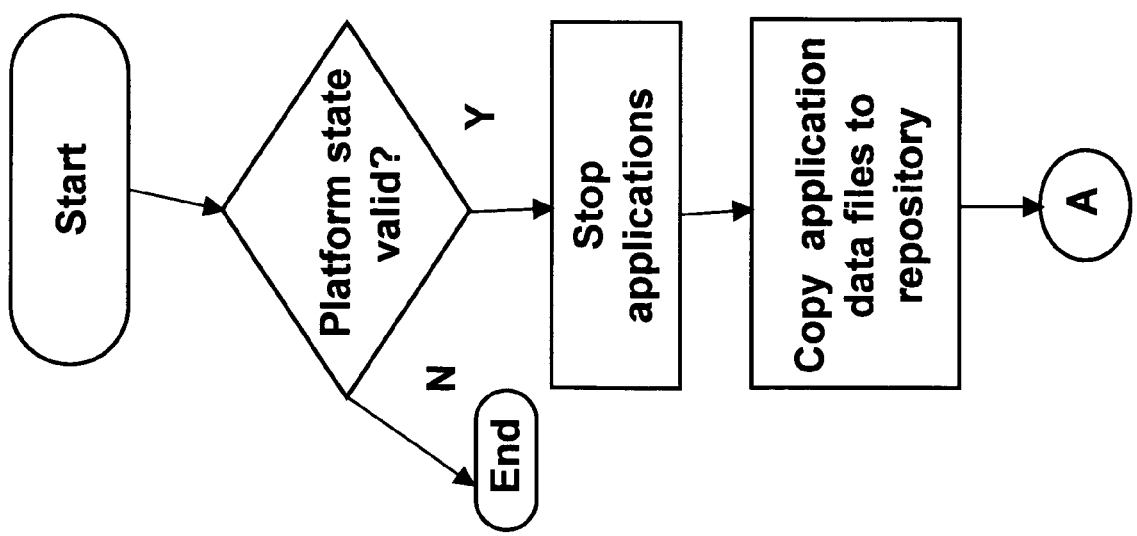
Figure 17

SYSTEM FOR CONTAINERIZATION OF APPLICATION SETS

CROSS-REFERENCE TO RELATED APPLICATIONS

This application claims priority of U.S. Provisional Patent Application No. 60/502,619 filed Sep. 15, 2003 and 60/512,103 filed Oct. 20, 2003, which are incorporated herein by reference for all purposes.

FIELD OF THE INVENTION

The invention relates to computer software. In particular, the invention relates to management and deployment of server applications.

BACKGROUND OF THE INVENTION

Computer systems are designed in such a way that application programs share common resources. It is traditionally the task of an operating system to provide a mechanism to safely and effectively control access to shared resources required by application programs. This is the foundation of multi-tasking systems that allow multiple disparate applications to co-exist on a single computer system.

The current state of the art creates an environment where a collection of applications, each designed for a distinct function, must be separated with each application installed on an individual computer system.

In some instances this separation is necessitated by conflict over shared resources, such as network port numbers that would otherwise occur. In other situations the separation is necessitated by the requirement to securely separate data such as files contained on disk-based storage and/or applications between disparate users.

In yet other situations, the separation is driven by the reality that certain applications require a specific version of operating system facilities and as such will not co-exist with applications that require another version.

As computer system architecture is applied to support specific services, it inevitably requires that separate systems be deployed for different sets of applications required to perform and or support specific services. This fact, coupled with increased demand for support of additional application sets, results in a significant increase in the number of computer systems being deployed. Such deployment makes it quite costly to manage the number of systems required to support several applications.

There are existing solutions that address the single use nature of computer systems. These solutions each have limitations, some of which this invention will address. Virtual Machine technology, pioneered by VmWare, offers the ability for multiple application/operating system images to effectively co-exist on a single compute platform. The key difference between the Virtual Machine approach and the approach described herein is that in the former an operating system, including files and a kernel, must be deployed for each application while the latter only requires one operating system regardless of the number of application containers deployed. The Virtual Machine approach imposes significant performance overhead. Moreover, it does nothing to alleviate the requirement that an operating system must be licensed, managed and maintained for each application. The invention described herein offers the ability for applications to more effectively share a common compute platform, and also allow applications to be easily moved between platforms, without the requirement for a separate and distinct operating system for each application.

A product offered by Softricity, called SoftGrid®, offers what is described as Application Virtualization. This product provides a degree of separation of an application from the underlying operating system. Unlike Virtual Machine technology a separate operating system is not required for each application. The SoftGrid® product does not isolate applications into distinct environments. Applications executing within a SoftGrid® environment don't possess a unique identity.

This invention provides a solution whereby a plurality of services can conveniently be installed on one or more servers in a cost effective and secure manner.

The following definitions are used herein:

Disparate computing environments: Environments where computers are stand-alone or where there are plural computers and where they are unrelated.

Computing platform: A computer system with a single instance of a fully functional operating system installed is referred to as a computing platform.

Container: An aggregate of files required to successfully execute a set of software applications on a computing platform is referred to as a container. A container is not a physical container but a grouping of associated files, which may be stored in a plurality of different locations that is to be accessible to, and for execution on, one or more servers. Each container for use on a server is mutually exclusive of the other containers, such that read/write files within a container cannot be shared with other containers. The term "within a container", used within this specification, is to mean "associated with a container". A container comprises one or more application programs including one or more processes, and associated system files for use in executing the one or more processes; but containers do not comprise a kernel; each container has its own execution file associated therewith for starting one or more applications. In operation, each container utilizes a kernel resident on the server that is part of the operating system (OS) the container is running under to execute its applications.

Secure application container: An environment where each application set appears to have individual control of some critical system resources and/or where data within each application set is insulated from effects of other application sets is referred to as a secure application container.

Consolidation: The ability to support multiple, possibly conflicting, sets of software applications on a single computing platform is referred to as consolidation.

System files: System files are files provided within an operating system and which are available to applications as shared libraries and configuration files.

By way of example, Linux Apache uses the following shared libraries, supplied by the OS distribution, which are "system" files.

/usr/lib/libz.so.1
/lib/libssl.so.2
/lib/libcrypto.so.2
/usr/lib/libaprutil.so.0
/usr/lib/libgdbm.so.2
/lib/libdb-4.0.so
/usr/lib/libexpat.so.0
/usr/lib/libapr.so.0
/lib/i686/libm.so.6
/lib/libcrypt.so.1

/lib/libnsl.so.1
/lib/libdl.so.2
/lib/i686/libpthread.so.0
/lib/i686/libc.so.6
/lib/ld-linux.so.2

Apache uses the following configuration files, also provided with the OS distribution:
/etc/hosts
/etc/httpd/conf
/etc/httpd/conf.d
/etc/httpd/logs
/etc/httpd/modules
/etc/httpd/run By way of example, together these shared library files and configuration files form system files provided by the operating system. There may be any number of other files included as system files. Additional files might be included, for example, to support maintenance activities or to start other network services to be associated with a container.

SUMMARY OF THE INVENTION

In a system having a plurality of servers with operating systems that differ, operating in disparate computing environments, wherein each server includes a processor and an operating system including a kernel a set of associated local system files compatible with the processor, a method is provided for providing at least some of the servers in the system with secure, executable, applications related to a service, wherein the applications may be executed in a secure environment, wherein the applications each include an object executable by at least some of the different operating systems for performing a task related to the service. The method comprises the steps of:

storing in memory accessible to at least some of the servers a plurality of secure containers of application software, each container comprising one or more of the executable applications and a set of associated system files required to execute the one or more applications, for use with a local kernel residing permanently on one of the servers; wherein the set of associated system files are compatible with a local kernel of at least some of the plurality of different operating systems, the containers of application software excluding a kernel, and wherein some or all of the associated system files within a container stored in memory are utilized in place of the associated local system files resident on the server prior to said storing step.

In accordance with another aspect of the invention a computer system is provided for performing a plurality of tasks each comprising a plurality of processes comprising:

a plurality of secure stored containers of associated files accessible to, and for execution on, one or more servers, each container being mutually exclusive of the other, such that read/write files within a container cannot be shared with other containers, each container of files having its own unique identity associated therewith, said identity comprising at least one of an IP address, a host name, and a MAC address; wherein, the plurality of files within each of the plurality of containers comprise one or more application programs including one or more processes, and associated system files for use in executing the one or more processes, each container having its own execution file associated therewith for starting one or more applications, in operation, each container utilizing a kernel resident on the server and wherein each container exclusively uses a kernel in an underlying operation system in which it is running and is absent its own kernel; and, a run time module for monitoring system calls from applications associated with one or more containers and for providing control of the one or more applications.

In accordance with a broad aspect, the invention provides a method of establishing a secure environment for executing, on a computer system, a plurality of applications that require shared resources. The method involves, associating one or more respective software applications and required system files with a container. A plurality of containers have these containerized files within.

Containers residing on or associated with a respective server each have a resource allocation associated therewith to allow the at least one respective application or a plurality of applications residing in the container to be executed on the computer system according to the respective resource allocation without conflict with other applications in other containers which have their given set of resources and settings.

Containers, and therefore the applications within containers, are provided with a secure environment from which to execute. In some embodiments of the invention, each group of applications is provided with a secure storage medium.

In some embodiments of the invention the method involves containerizing the at least one respective application associated respective secure application container, the respective secure application container being storable in a storage medium.

In some embodiments of the invention, groups of applications are containerized into a single container for creating a single service. By way of example applications such as Apache, MySql and PHP may all be grouped in a single container for supporting a single service, such as a web based human resource or customer management type of service.

In some embodiments of the invention, the method involves exporting one or more of the respective secure application containers to a remote computer system.

In an embodiment of the invention, each respective secure application-container has data files for the at least one application within the respective secure application container.

The method involves making the data files within one of the respective secure application containers inaccessible to any respective applications within another one of the secure application containers.

In embodiments of the invention, all applications within a given container have their own common root file system exclusive thereto and unique from other containers and from the operating system's root file system.

In embodiments of the invention, a group of applications within a single container share a same IP address, unique to that container.

Hence in some embodiments of the invention a method is provided for associating a respective IP address for a group of applications within a container.

In some embodiments of the invention, for each container of applications, the method involves associating resource limits for all applications within the container.

In some embodiments of the invention, for each group of the plurality of groups of applications, for example, for each container of applications and system files, the method involves associating resource limits comprising any one or more of limits on memory, CPU bandwidth, Disk size and bandwidth and Network bandwidth for the at least one respective application associated with the group.

For each secure application container, the method involves determining whether resources available on the computer system can accommodate the respective resource allocation associated with the group of applications comprising the secure application container.

By way of example, when a container is to be placed on a platform comprising a computer and an operating system (OS) a check is done to ensure that the computer can accommodate the resources required for the container. Care is exercised to ensure that the installation of a container will not overload the computer. For example, if the computer is using 80% of its CPU capacity and installing the container will increase its capacity past 90% the container is not installed.

If the computer system can accommodate the respective resource allocation associated with the group of applications forming the secure application container, the secure application container is exported to the computer system.

Furthermore, in another embodiment, if one or more secure application containers are already installed on the computer system, the method involves determining whether the computer system has enough resources available to accommodate the one or more secure application containers are already installed in addition to the secure application container being exported.

If there are enough resources available, the resources are distributed between the one or more secure application containers and the secure application container being exported to provide resource control.

In some embodiments of the invention, in determining whether resources available on the computer system to accommodate the respective resource allocation, the method involves verifying whether the computer system supports any specific hardware required by the secure application container to be exported. Therefore, a determination can be made as whether any specific hardware requirements of the applications within a container are supported by the server into which the container is being installed. This is somewhat similar to the abovementioned step wherein a determination is made as to whether the server has sufficient resources to support a container to be installed.

In some embodiments of the invention, for each group of applications within a container, in associating a respective resource allocation with the group, the method involves associating resource limits for the at least one respective application associated with the group.

More particularly, the method also involves, during execution on the computer system:

monitoring resource usage of the at least one respective application associated with the group;

intercepting system calls to kernel mode, made by the at least one respective application associated with the group of applications from user mode to kernel mode;

comparing the monitored resource usage of the at least one respective application associated with the group with the resource limits;

and forwarding the system calls to a kernel on the basis of the comparison between the monitored resource usage and the resource limits.

The above steps define that the resource limit checks are done by means of a system call intercept, which is, by definition, a hardware mechanism where an application in user mode transitions to kernel code executing in a protected mode, i.e. kernel mode. Therefore, the invention provides a mechanism whereby certain, but not all system calls are intercepted; and wherein operations specific to the needs of a particular container are performed, for example, checks determines if limits may have been exceeded, and then allows the original system to proceed.

Furthermore, in some instances a modification may be made to what is returned to the application; for example, when a system call is made to retrieve the IP address or hostname. The system in accordance with an embodiment of this invention may choose to return a container specific value as opposed to the value that would have otherwise been normally returned by the kernel. This intervention is termed "spoofing" and will be explained in greater detail within the disclosure.

BRIEF DESCRIPTION OF THE DRAWINGS

Exemplary embodiments may be envisaged without departing from the spirit and scope of the invention.

FIG. 1 is a schematic diagram illustrating a containerized system in accordance with an embodiment of this invention.

FIG. 16 is a flow chart of a method of installing a software application on a computing platform in response to a drag and drop operation of FIG. 14; and, FIG. 17 is a flow chart of a method of de-installing a software application from a computing platform in response to a drag and drop operation of FIG. 13.

DETAILED DESCRIPTION

Figure 2:
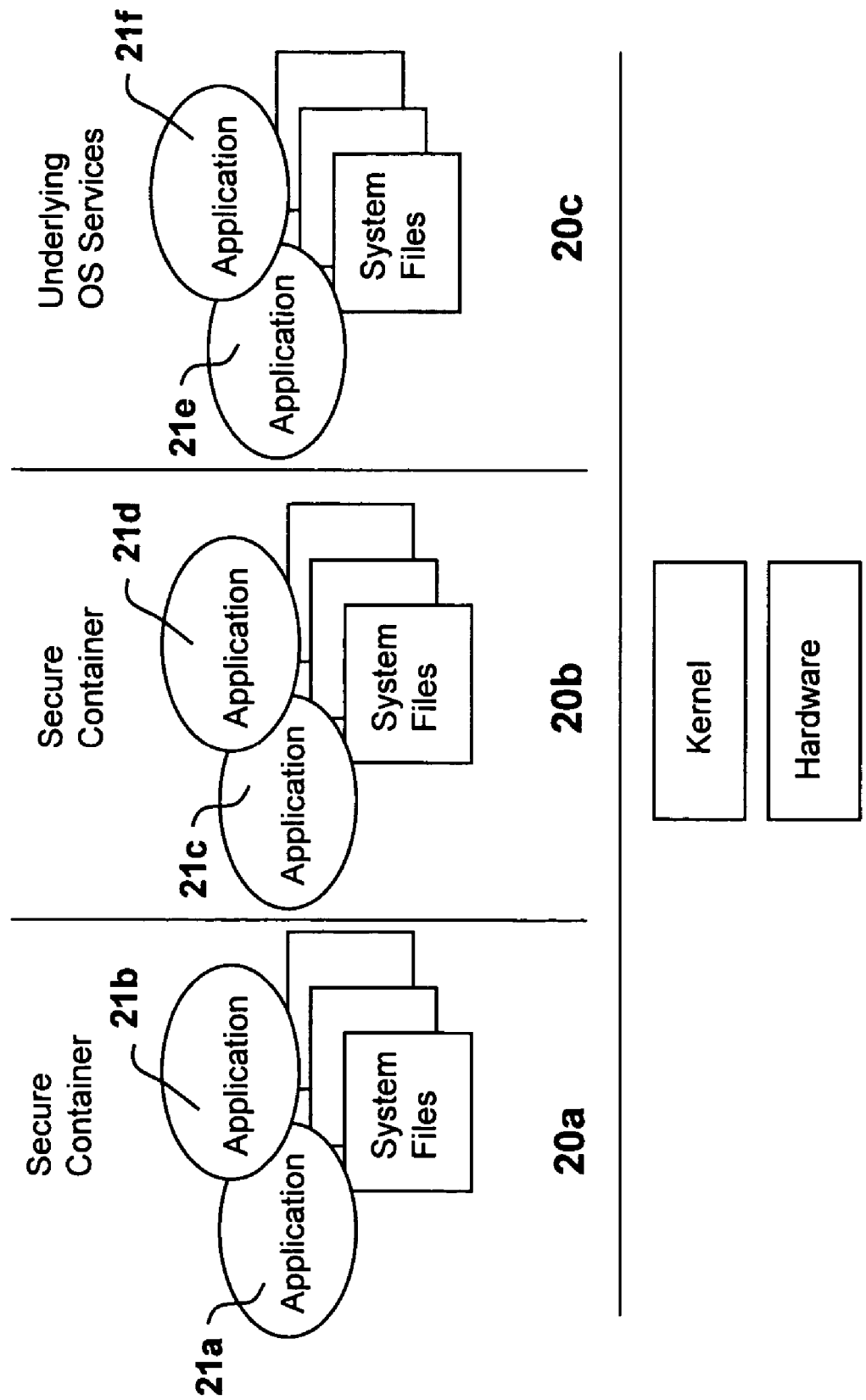
FIG. 2 is a schematic diagram illustrating a system wherein secure containers of applications and system files are installed on a server in accordance with an embodiment of the invention.

Turning now to FIG. 1, a system is shown having a plurality of servers 10a, 10b. Each server includes a processor and an independent operating system. Each operating system includes a kernel 12, hardware 13 in the form of a processor and a set of associated system files, not shown. Each server with an operating system installed is capable of executing a number of application programs. Unlike typical systems, containerized applications are shown on each server having application programs 11a, 11b and related system files 11c.

These system files are used in place of system files such as library and configuration files present typically used in conjunction with the execution of applications.

FIG. 2 illustrates a system in accordance with the invention in which multiple applications 21a, 21b, 21c, 21d, 21e, and 21f can execute in a secure environment on a single server. This is made possible by associating applications with secure containers 20a, 20b and 20c. Applications are segregated and execute with their own copies of files and with a unique identity. In this manner multiple applications may contend for common resources and utilize different versions of system files. Moreover, applications executing within a secure container can co-exist with applications that are not associated with a container, but which are associated with the underlying operating system.

Containers are created through the aggregation of application specific files. A container contains application and data files for applications that provide a specific service. Examples of specific services include but are not limited to CRM (Customer Relation Management) tools, Accounting, and Inventory.

The Secure application containers 20a, 20b and 20c are shown in FIG. 2 in which each combines un-installed application files on a storage medium or network, application files installed on a computer, and system files. The container is an aggregate of all files required to successfully execute a set of software applications on a computing platform. In embodiments of the invention, containers are created by combining application files with system files.

The containers are output to a file storage medium and installed on the computing platforms from the file storage medium. Each container contains application and data files for applications that together provide a specific service. The containers are created using, for example, Linux, Windows and Unix systems and preferably programmed in C and C++; however, the invention is not limited to these operating systems and programming languages and other operating systems and programming language may be used. An application set is a set of one or more software applications that support a specific service. As shown in the figures, which follow, application files are combined with system files to create a composite or container of the files required to support a fully functional software application.

Figure 3:
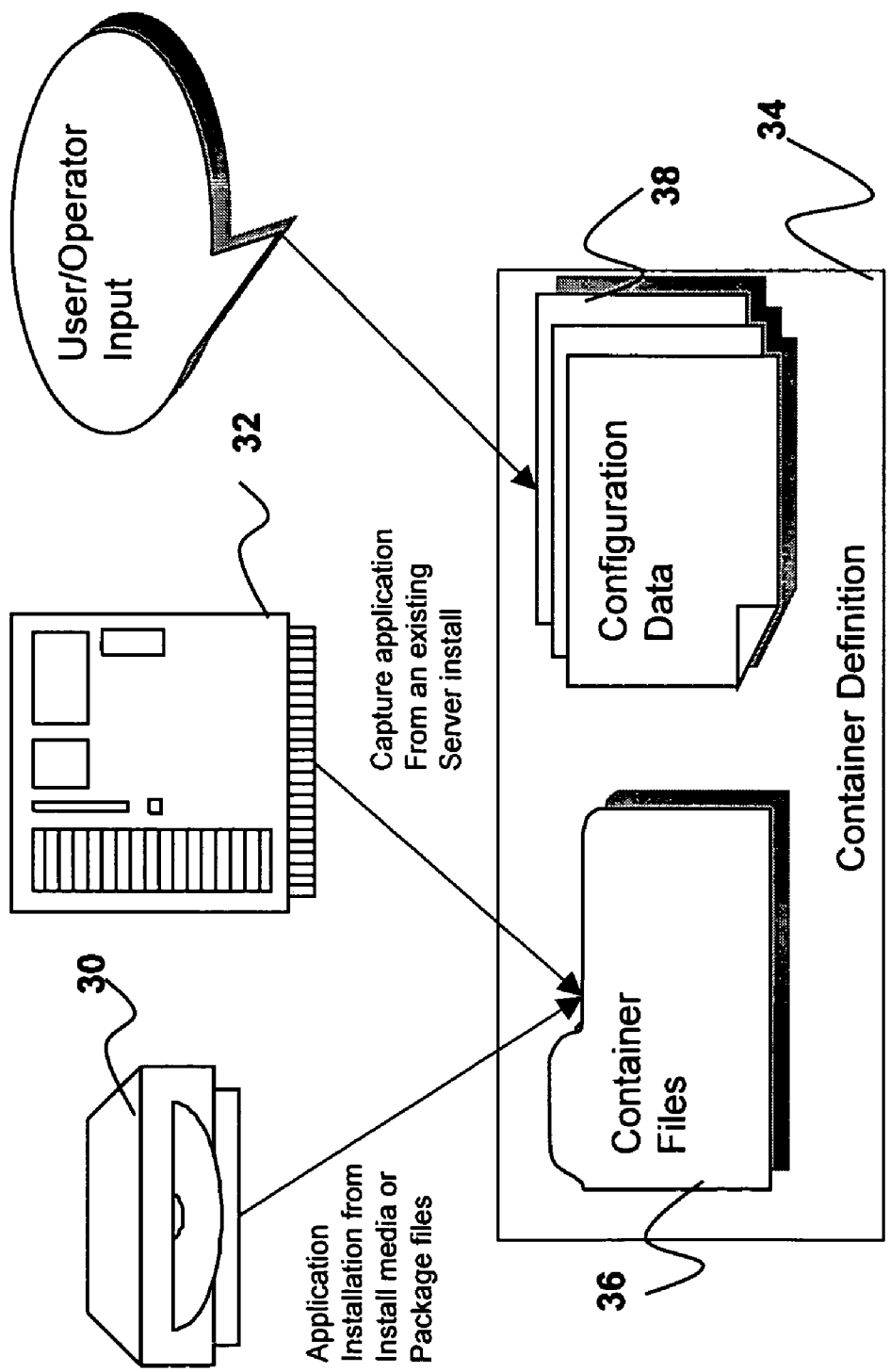
FIG. 3 is a pictorial diagram illustrating the creation of a container.

Referring now to FIG. 3 the creation of a container is illustrated from the files used by a specific application and user defined configuration information. The required files can be captured from an existing computer platform 32 where an application of interest is currently installed or the files can be extracted from install media or package files 30. Two methods of container creation will be described hereafter.

Figure 4:
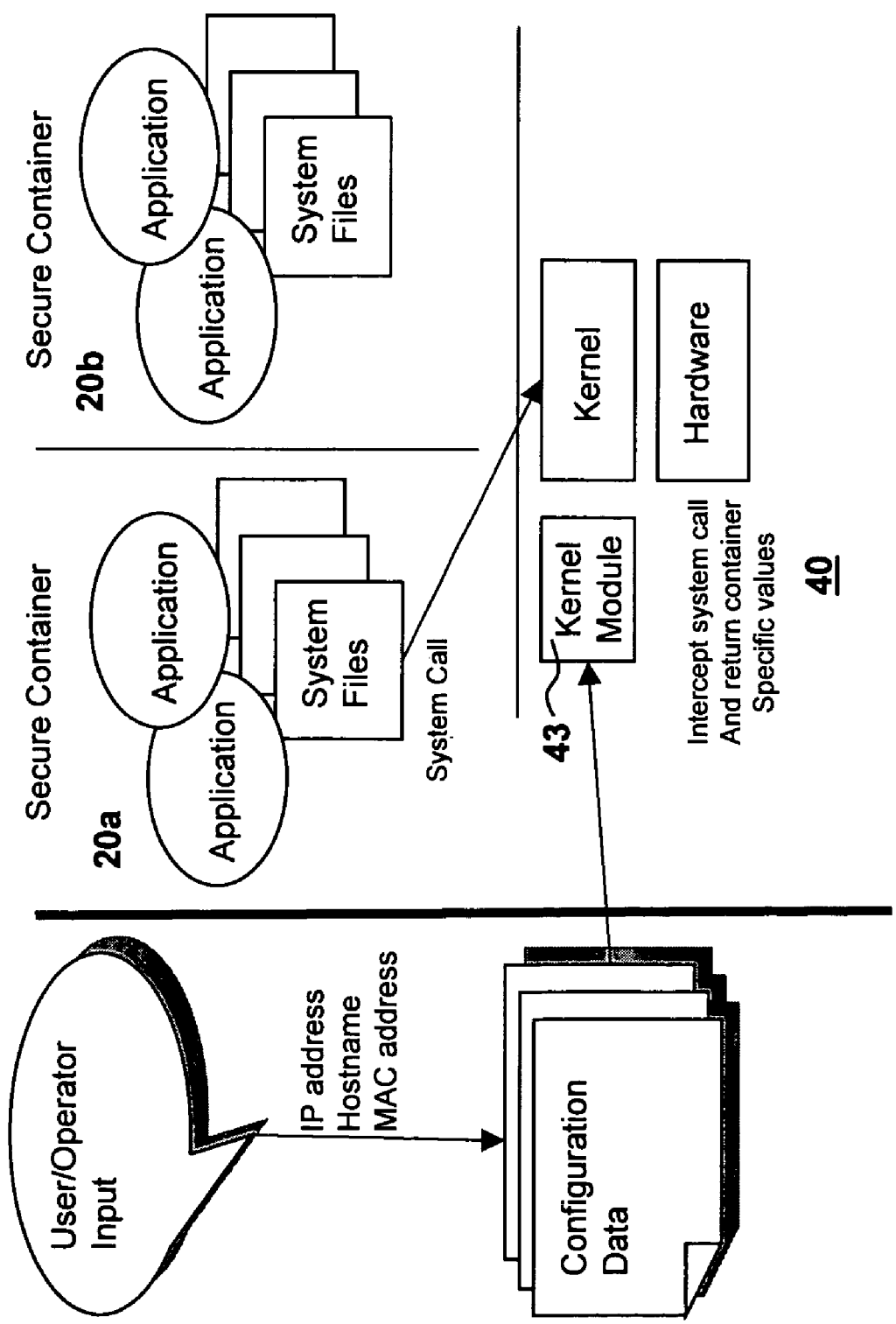
FIG. 4 is a diagram illustrating how a container is assigned a unique identity such as IP address, Hostname, and MAC address and introduces the "kernel module" which is used to handle system calls.

FIG. 4 illustrates a system having two secure containers 20a 20b, each provided with a unique identity. This allows, for example, other applications to locate a containerized service in a consistent manner independent of which computer platform the containerized service is located on. Container configuration data, collected from a user or user-defined program, is passed to services resident on a computer platform 40 hosting containers. One embodiment shows these services implemented in a kernel module 43. The configuration information is transferred one time when the container is installed on a platform. The type of information required in order to provide an application associated with a container a unique identity includes items such as an IP address, MAC address and hostname. As applications execute within a container 20a, 20b environment system calls are intercepted, by the kernel module 43 passing through services installed as part of this invention, before being passed on to the kernel. This system call intercept mechanism allows applications to be provided with values that are container specific rather than values that would otherwise be returned from the kernel by "spoofing" the system.

As introduced heretofore, "spoofing" is invoked when a system call is made. Instead of returning values ordinarily provided by the operating system's kernel a module in accordance with this invention intervenes and returns container specific values to the application making the system call. By way of example, when an application makes the 'uname' system call, the kernel returns values for hostname, OS version, date, time and processor type. The software module in accordance with this invention intercepts the system call and causes the application to see kernel defined values for date, time and processor type; however, the hostname value is purposely changed to one that is container specific. Thus, the software has 'spoofed' the 'uname' system call to return a container specific hostname value rather than the value the kernel would ordinarily return. This same "spoofing" mechanism applies to system calls that return values such as MAC address, etc. A similar procedure exists for network related system calls, such as bind. For other system calls, such as fork and exit (create and delete a new process) the software does not alter what is returned to the application from the kernel; however, the system records that an operation has occurred, which results in the system call intercept of fork not performing any spoofing. The fork call is intercepted for purposes of tracking container-associated activity.

By way of example, if a process within a container creates a new process, by making a fork system call, the new process would be recorded as a part of the container that created it.

System calls are intercepted to perform the following services:

tracking applications, for example a tracking of which applications are in and out of a specific container;

spoofing particular values returned by the kernel;

applying resource checks and imposing resource limits;

monitoring whether an application is executing as expected, retrieving application parameters; and, which applications are being used, by who and for how long; and, retrieving more complex application information including information related to which files have been used, which files have been written to, which sockets have been used and information related to socket usage, such as the amount of data transferred through a given socket connection.

Figure 5:
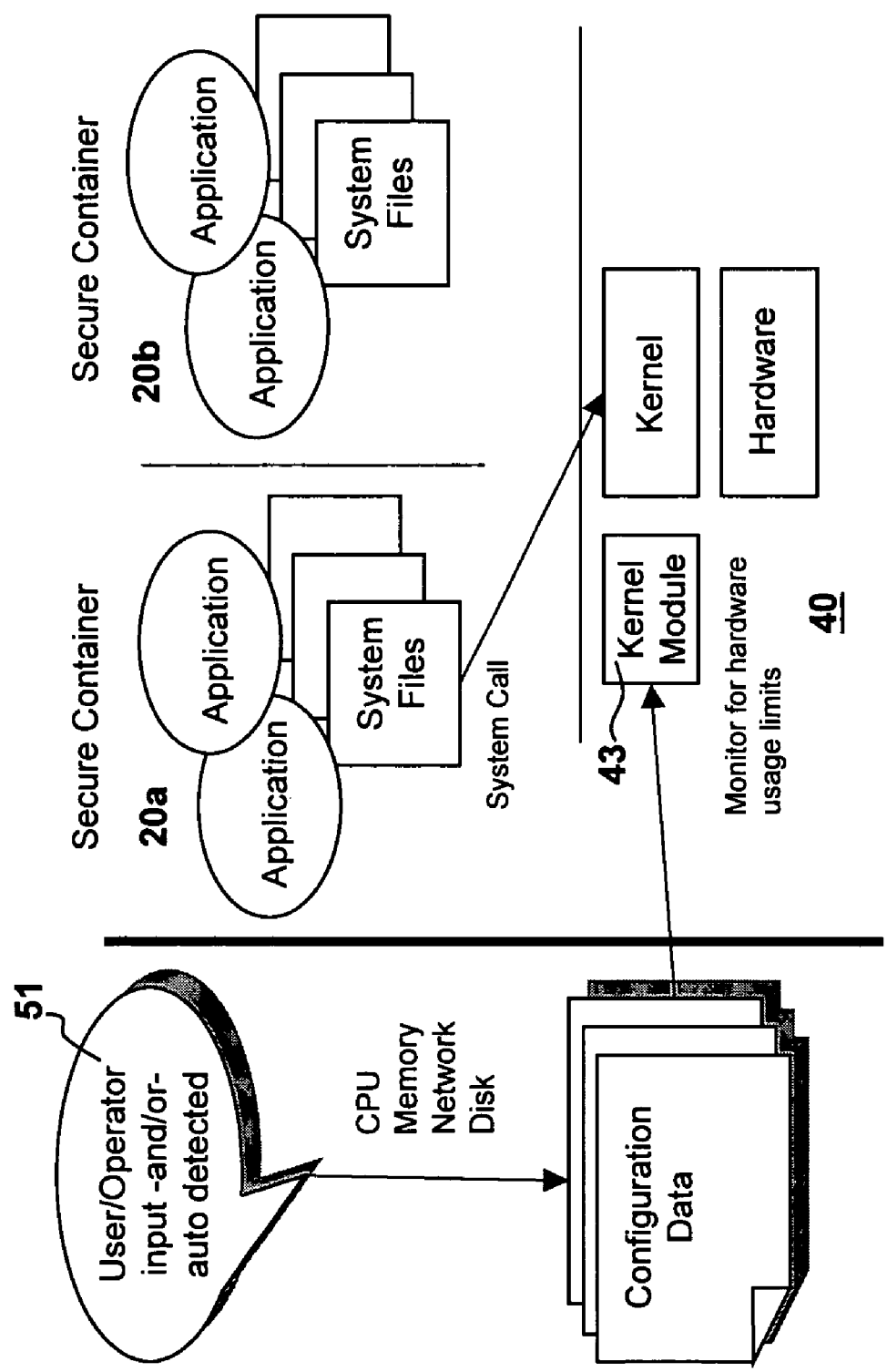
FIG. 5 is a diagram similar to FIG. 4, wherein additional configuration data is provided.

Container configuration includes the definition of hardware resource usage, as depicted in FIG. 5 including the amount of CPU, memory, network bandwidth and disk usage required to support the applications to be executed in association with the container 20a or 20b. These values can be used to determine resource requirements for a given compute platform 40. They can also be used to limit the amount of hardware resources allocated to applications associated with a container. Values for hardware resources can be defined by a user 51 when a container is created. They can be modified after container creation. It is also possible for container runtime services to detect the amount of resources utilized by applications associated with a container. In the automatic detection method values for hardware resources are updated when the container is removed from a compute platform. The user-defined values can be combined with auto-detected values as needed. In this model a user defines values that are then modified by measured values and updated upon container removal.

Figure 6:
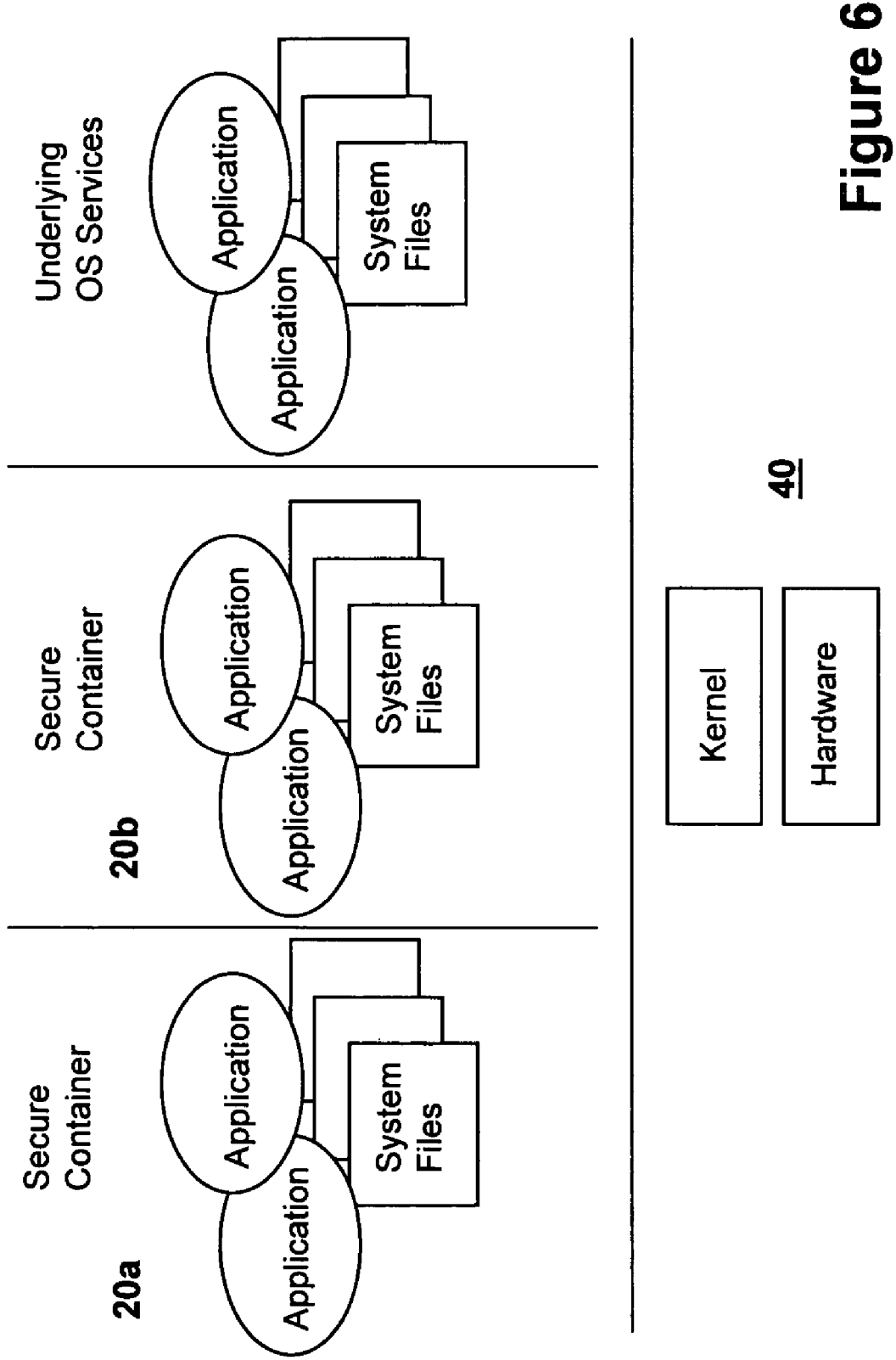
FIG. 6 is a diagram illustrating a system wherein the containers are secure containers.

It can be seen from FIG. 6 that each application executing associated with a container 20a or 20b, or contained within a container 20a or 20b, is able to accesses files that are dedicated to the container. Applications with a container association, that is, applications contained within a container, are not able to access the files provided with the underlying operating system of the compute platform 40 upon which they execute. Moreover, applications with a container 20a association are not able to access the files contained in another container 20b.

Figure 7:
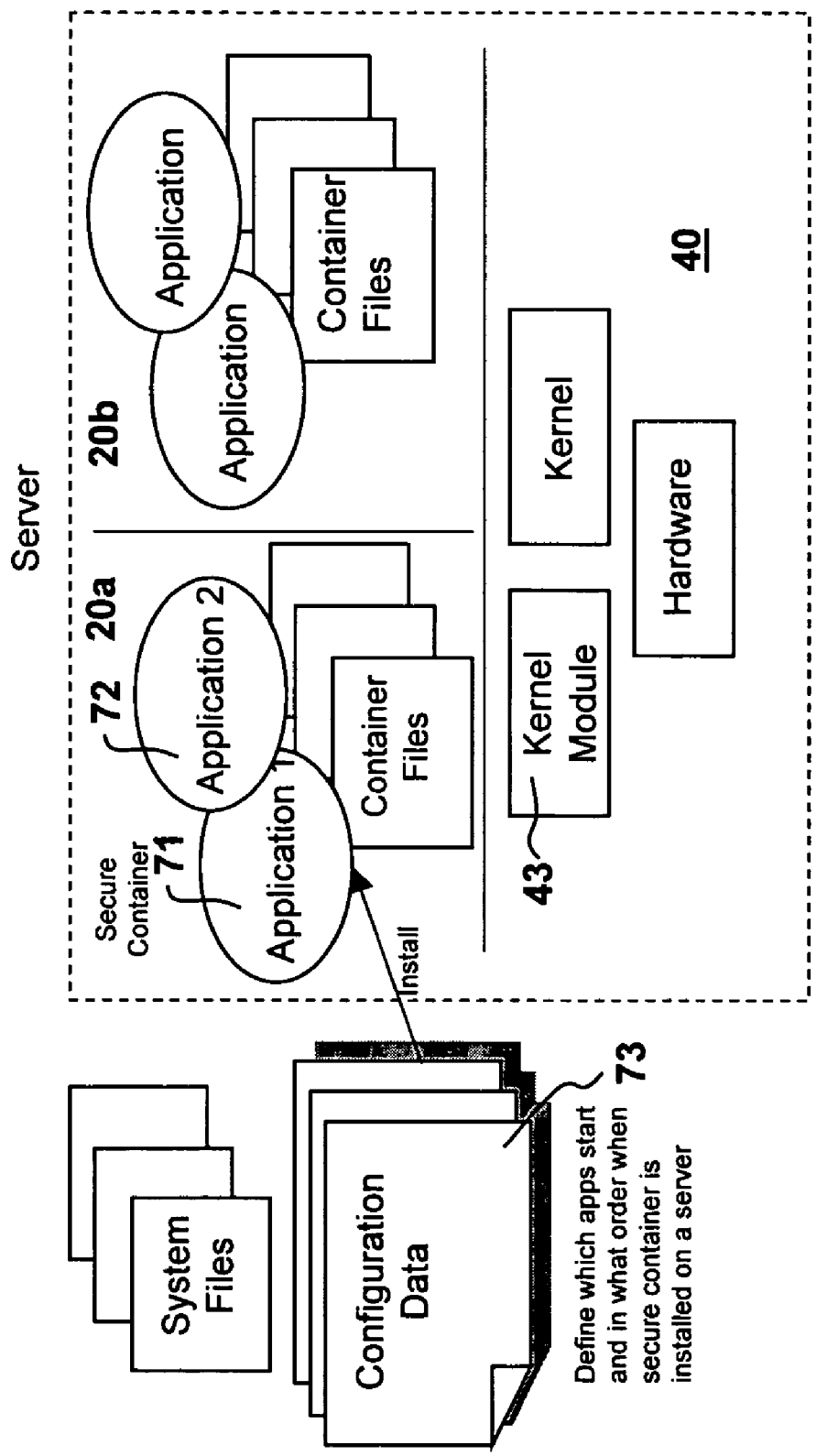
FIG. 7 is a diagram introducing the sequencing or order in which applications within a container are executed.

When a container 20a or 20b is installed specific applications are started, as is shown in FIG. 7 and container configuration information defines how applications 71, 72 are started. This includes the definition of a first program to start when a container is installed on a compute platform 40. The default condition, if not customized for a specific container, will start a script that in turn runs other scripts. A script associated with each application is provided in the container file system. The controller script 73, delineating the first application started in the container, runs each application specific script in turn. This allows for any number of applications to be started with a container association.

Special handling is required to start the first application such that it is associated with a container. Subsequent applications and processes created, as a result of the first application, will be automatically associated with the container. The automatic association is done through tracking mechanisms based on system call intercept. These are contained in a kernel module 43 in one embodiment of the invention. For example, fork, exit and wait system calls are intercepted such that container association can be applied to applications.

The first application started when a container is installed, is associated with the container by informing the system call intercept capabilities, embodied in the kernel module, shown in FIG. 7, that the current process is part of the container. Then, the application 71 is started by executing the application as part of the current process. In this way, the first application is started in the context of a process that has been associated with the container.

Figure 8:
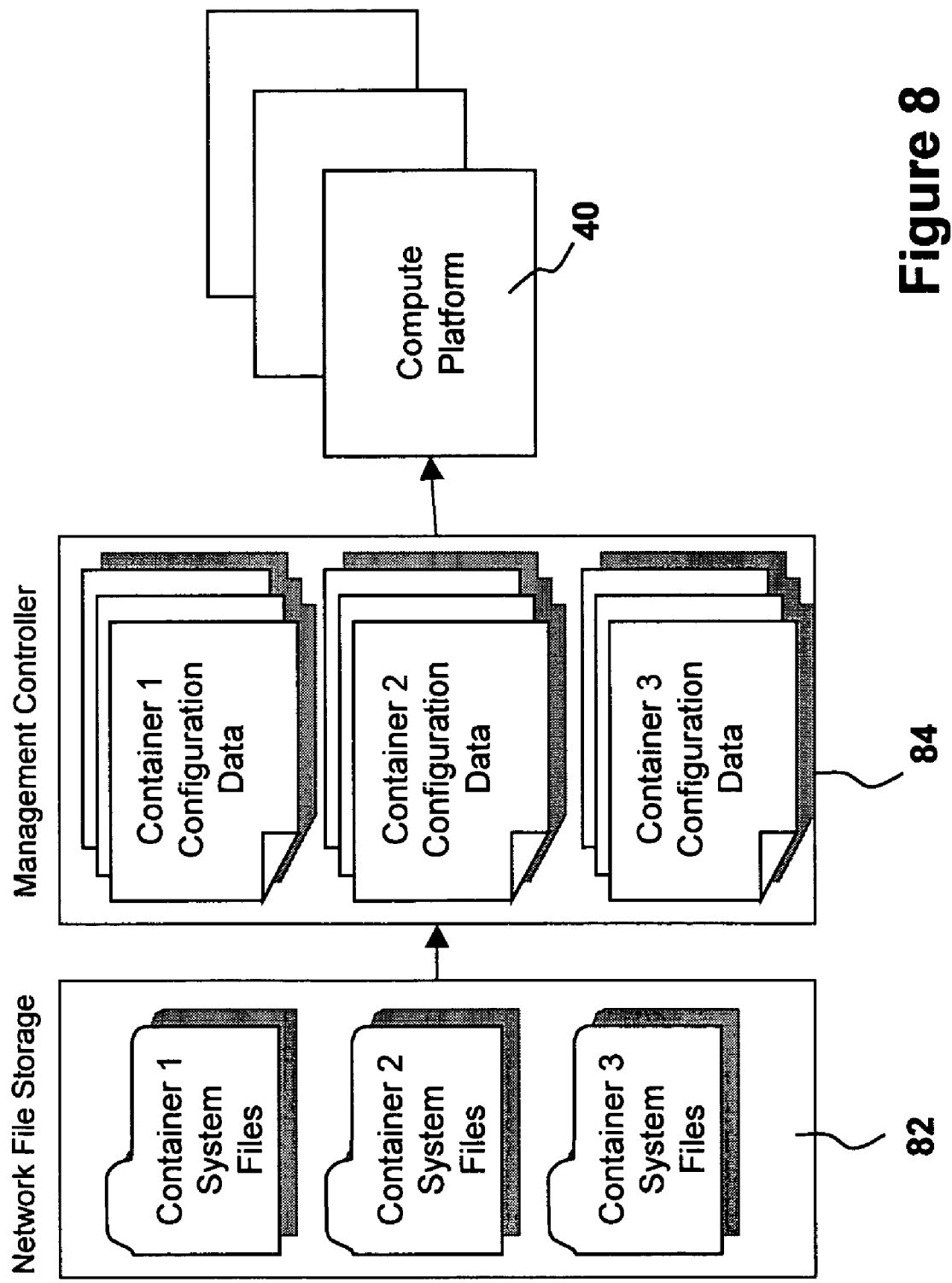
FIG. 8 is a diagram illustrating the relationship between the storage of container system files and container configuration data for a plurality of secure containers which may be run on a particular computer platform.

A container has a physical presence when not installed on a compute platform 40. It is described as residing on a network accessible repository. As is shown in FIG. 8, a container has a physical presence in two locations 82, 84; or stated differently, the files associated with a container have a physical presence in two locations 82, 84. The files used by applications associated with a container reside on a network file server 82. Container configuration is managed by a controller. The configuration state is organized in a database 84 used by the controller. A container then consists of the files used by applications associated with the container and configuration information. Configuration information includes those values which provide a container with a unique identity, for example a unique IP address, MAC address, name, etc., and which describe how a container is installed, starts a first application and shuts down applications when removed.

In a first embodiment all files are exclusive. That is, each container has a separate physical copy of the files required by applications associated with the container. In future embodiments any files that is read-only will be shared between containers.

Figure 9:
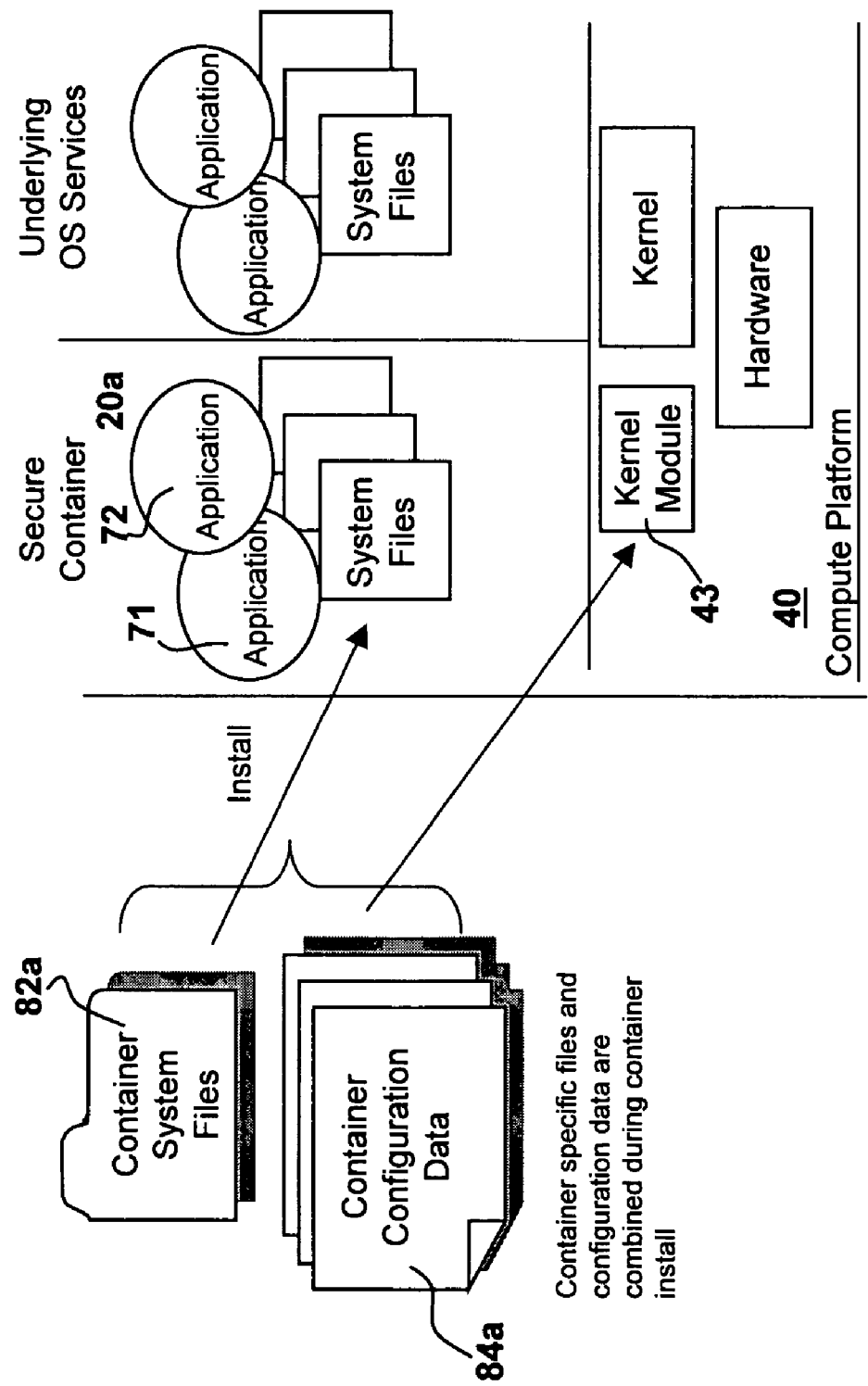
FIG. 9 is a diagram that illustrates the installation of a container on a server.

When a container is installed on a compute platform the files used by applications associated with the container and container specific configuration information elements are combined. FIG. 9 shows that the files 82a, 84a are either copied, physically placed on storage local to the compute platform 40, or they are mounted from a network file storage server. When container files are mounted no copy is employed.

Configuration information is used to direct how the container is installed. This includes operations such as describing the first application to be started, mount the container files, if needed, copy files, if needed and create an IP address alias.

Container information is also used to provide the container with a unique identity, such as IP address, MAC address and name. Identity information is passed to the system call intercept service, shown as part of a kernel module 43 in FIG. 9.

Figure 10:
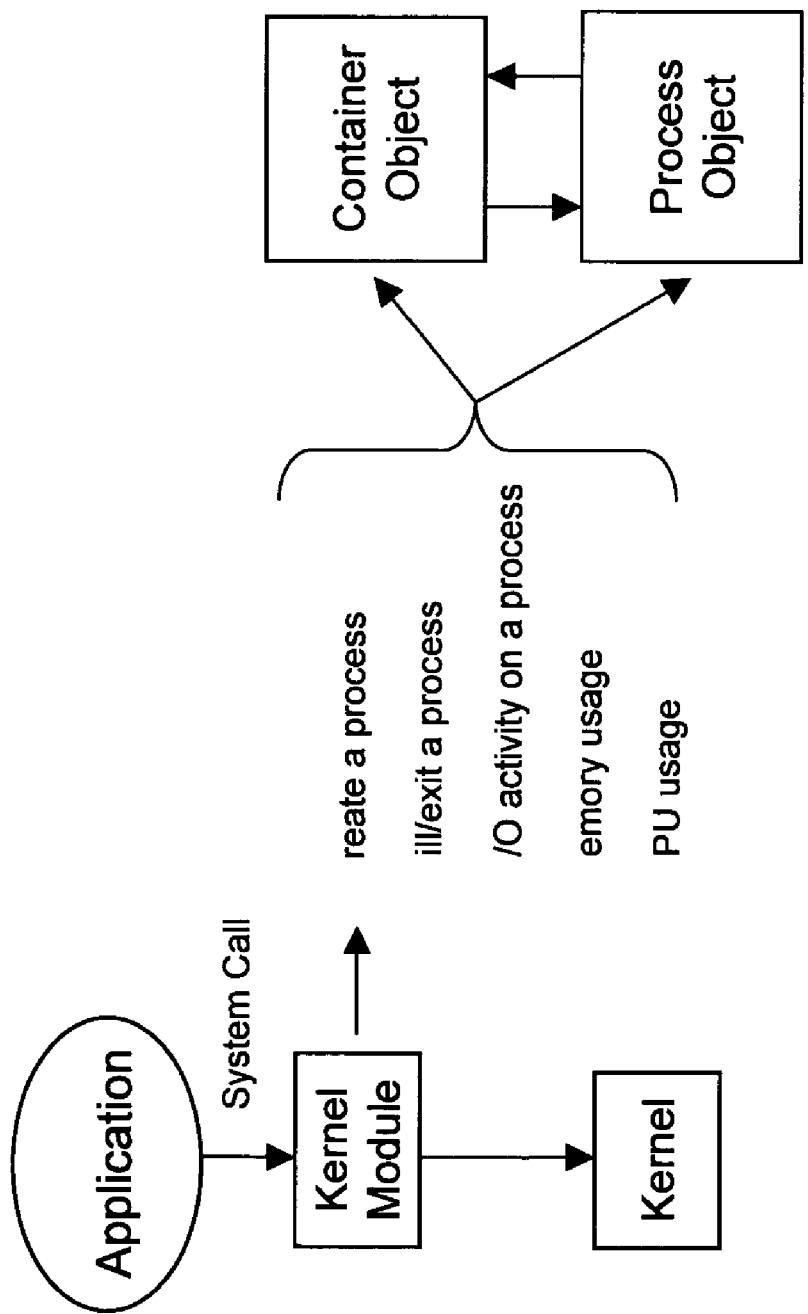
FIG. 10 is a diagram that illustrates the monitoring of a number of applications and state information.
Figure 11:
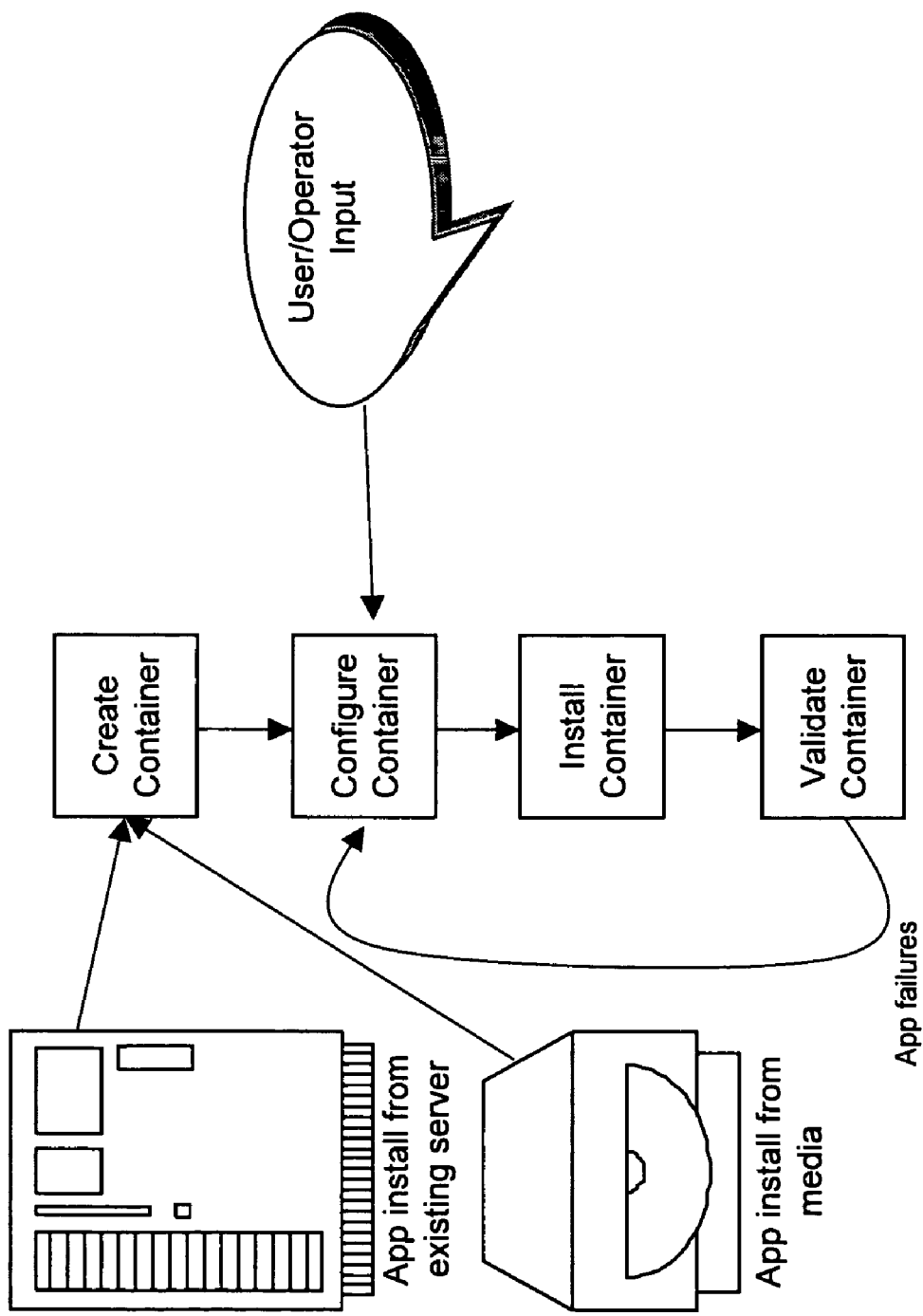
FIG. 11 is a diagram which shows that the container creation process includes the steps to install the container and validate that applications associated with the container are functioning properly.

As the software application associated with or contained in a container is executed it is monitored through the use of system call intercept. FIG. 10 shows that a number of operations are monitored. State information relative to application behavior is stored in data structures managed by the system call intercept capabilities. The information gathered in this manner is used to track which processes are associated with a container, their aggregate hardware resource usage and to control specific values returned to the application. Hardware resource usage includes CPU time, memory, file activity and network bandwidth.

FIG. 3 illustrates container creation. The result of container creation is the collection of files required by applications associated with the container and the assembly of container specific configuration information. Container files include both those files provided by an operating system distribution and those files provided by an application install media or package file.

These files can be obtained by using a compute platform upon which the application of interest has been installed. In this case the files are copied from the existing platform. Alternatively, a process where the files from the relative operating system distribution are used as the container files, the container is installed on a compute platform an then application specific files are applied from applicable install media or package file. The result in either case is the collection of all files needed by applications associated with the container onto a network accessible repository.

Container specific configuration information is assembled from user input. The input can be obtained from forms in a user interface, or programmatically through scripting mechanisms.

Two methods of container creation are provided and either of the two can be utilized, depending upon particular circumstances. In a first method of container creation a "skeleton" file system is used. This is a copy of the system files provided with a given operating system (OS) distribution. The skeleton file system is placed on network storage, accessible to other servers. The skeleton file system includes the OS provided system files before an application is installed. A container is created from this skeleton file system. Subsequently, a user logs into the container and installs applications as needed. Most installations use a service called ssh to login to the system which is used to log into a container.

Referring once again to FIG. 3, applications may come from third party installation media on CDROM, package files 30, or as downloads from a web site, etc. Once installed in the container the applications become unique to the container in the manner described way that has been described heretofore.

The second method employed to create a container file system uses an existing server, for example a computer or server already installed in a data center. This is also shown in FIG. 3. The applications of interest may have been installed on an existing server before the introduction of the software and data structures in accordance with this invention. Files are copied from the existing server 32, including system files and application specific files to network storage. Once the files are copied from the existing server a container is created from those files.

The description of the two methods above differs in that in one instance the container creation begins with the system files only. The container is created from the system files and then the applications and required files are added and later installed. In the second instance, which is simpler, both system and application files are retrieved, together, from an existing server, and then the container is created. In this manner, the container file system comprises the application and system files.

Once a set of files that are retrieved for creating a container, for example system files only or system and application files, a subset of the system files are modified. The changes made to this subset are quite diverse. Some examples of these changes are:

modifying the contents a file to add a container specific IP address;

modifying the contents of a directory to define start scripts that should be executed;

modifying the contents of a file to define which mount points will relate to a container;

removing certain hardware specific files that are not relevant in the container context, etc., dependent upon requirements.

In some embodiments of the invention, the method involves copying the application specific files, and related data and configuration information to a file storage medium.

This may be achieved with the use of a user interface in which application programs are displayed and selected for copying to a storage medium. In some embodiments of the invention, the application specific files, and related data and configuration information are made available for installation into secure application containers on a remote computer system.

In some embodiments of the invention, the method involves installing at least one of the pluralities of applications in a container's own root file system.

In summary, the invention involves combining and installing at least one application along with system files or a root file system to create a container file system. A container is then created from a container file system and container configuration parameters.

A resource allocation is associated with the secure application container for at least one respective application containerized within the secure application container to allow the at least one respective application containerized within the secure application container to be executed on the computer system without conflict with other applications containerized within other secure application containers.

Thus, a container has an allocation of resources associated with it to allow the application within the container to be executed without contention.

This allocation of resources is made during the container configuration as a step in creating the container. An active check for resource allocation against resources available is performed. Containerized applications may run together within a container; and, non-containerized applications may run outside of a container context on a same computer platform.

Drag and Drop Application Management

Another aspect of this relates to software that manages the operation of a data center.

There has been an unprecedented proliferation of computer systems in the business enterprise sector. This has been a response to an increase in the number and changing nature of software applications supporting key business processes. Management of computer systems required to support these applications has become an expensive proposition. This is partially due to the fact that each of the software applications are in most cases hosted on an independent computing platform or server. The result is an increase in the number of systems to manage.

An aspect of this invention provides a method of installing a software application on a computing platform. The terms computing platform, server and computer are used interchangeably throughout this specification. The method in accordance with this aspect of the invention includes displaying a software application icon representing the software application and a computing platform icon representing the computing platform.

In operation, a selection of the software application for installation is initiated using the software application icon; and a selection of the computing platform to which the software application is to be installed is initiated using the computing platform icon. Installation of the selected software application is then initiated on the selected computing platform.

The computing platform may be a remote computing platform. In some embodiments, the selection of the software application is received with the use of a graphical user interface in response to the software application icon being pointed to using a pointing device.

In a preferred embodiment of the invention, the pointing device is a mouse and the selection of the computing platform is received in response to the software application icon being dragged over the computing platform icon and the software application icon being dropped. The installation of the selected software application on the selected computing platform is initiated in response to the software application icon being dropped over the computing platform icon.

Within this specification reference to drag and drop has a conventional meaning of selecting an icon and dragging it across the screen to a target icon; notwithstanding, selecting a first icon and then pointing to a target icon, shall have a same meaning and effect throughout this specification. Relatively moving two icons is meant to mean moving one icon toward another.

In some embodiments, upon initialization, the selected computing platform is tested to determine whether it is a valid computing platform.

In some embodiments, upon initialization, a user account is created for the selected software application.

In some embodiments, upon initialization, files specific to the selected application software are installed on the selected computing platform.

In some embodiments, upon initialization, file access permissions are set to allow a user to access the application.

In some embodiments, upon initialization, a console on the selected computing platform is updated with information indicating that the selected software application is resident on the selected computing platform.

In accordance with another broad aspect, the invention provides a method of de-installing a software application from a computing platform comprising the steps of displaying a software application icon representing the software application and a computing platform icon representing the computing platform on which the software application is installed. A selection of the software application for de-installation using the software application icon is received. A selection of the computing platform from which the software application is to be de-installed using the computing platform icon is also received. De-installation of the selected software application from the selected computing platform is then initiated.

The computing platform may be a remote computing platform.

In some embodiments, the displaying comprises displaying the software application as being installed on the computing platform with the use of the software application icon and the computing platform icon.

In some embodiments, the selection of the software application is received with the use of a graphical user interface in response to the software application icon being pointed to using a pointing device.

In some embodiments, the pointing device is a mouse.

In some embodiments, the selection of the computing platform is in response to the software application icon being dragged away from the computing platform icon and the software application icon being dropped.

In some embodiments, upon initialization, the selected computing platform is tested to determine whether it is a valid computing platform for de-installation of the software application.

In some embodiments, upon initialization, any process associated with the selected software application is stopped.

In some embodiments, upon initialization, data file changes specific to the software application are copied back to a storage medium from which the data file changes originated prior to installation.

In some embodiments, upon initialization, a user account associated with the selected software application is removed.

In some embodiments, upon initialization, a console on the computing platform is updated with information indicating that the selected software application is no longer resident on the selected computing platform.

The invention provides a GUI (Graphical User Interface) adapted to perform any of the above method steps for installation or de-installation.

The invention provides a GUI adapted to display a software application icon representative of a software application available for installation and display a computing platform icon representative of a computing platform.

The GUI is responsive to a selection of the software application icon and the computing platform icon by initiating installation of the software application on the computing platform. The invention provides a GUI adapted to display a software application icon representative of a software application and display a computing platform icon representative of a computing platform, the GUI being responsive to a selection of the software application icon and the computing platform icon by initiating de-installation of the software application from the computing platform.

The GUI is adapted to display a software application icon representative of a software application installed on a computing platform, the GUI being responsive to a selection of the software application icon by initiating de-installation of the software application from the computing platform.

Selection can be made using a drag and drop operation.

The method of de-installation includes displaying a software application icon representing the software application installed on a computing platform. A selection of the software application for de-installation from the computing platform is received using the software application icon. The de-installation of the selected software application from the computing platform is then initiated. In some embodiments, the selection of the application icon is in response to the software application icon being dragged away. In some embodiments, the de-installation of the selected software application from the computing platform is initiated in response to the software application icon being dropped.

Accordingly, the invention relates, in part to methods of installing and removing software applications through a selection such as, for example, a graphical drag and drop operation. In some embodiments of the invention, functions of the GUI support the ability to select an object, move it and initiate an operation when the object is placed on a specific destination. This process has supported operations including the copy and transfer of files. Some embodiments of the invention extend this operation to allow software applications, represented by a graphical icon, to be installed in working order following a drag and drop in a graphical user interface.

The following definitions are used herein:

Storage repository: A centralized disk based storage containing application specific files that make up a software application.

GUI (Graphical User Interface): A computer-based display that presents a graphical interface by which a user interacts with a computing platform by means of icons, windows, menus and a pointing device is referred to as a GUI.

Icon: An icon is an object supported by a GUI. Normally an icon associates an image with an object that can be operated on through a GUI.

Aspects of the invention include:
GUI supporting drag and drop operations
Icons
Storage medium
Console
Network connections
One or more computing platforms While software applications are represented as graphical icons, they are physically contained in a storage medium. Such a storage medium consists, for example, of disk-based file storage on a server accessible through a network connection. A computing platform is a computer with an installed operating system capable of hosting software applications.

When a software application icon is "dropped" on a computing platform the applications associated with the icon are installed in working order on the selected platform. The computing platform is generally remote with respect to either the platform hosting the graphical interface or the server hosting the storage medium. This topology is not strictly required, but rather a likely scenario.

Figure 12:
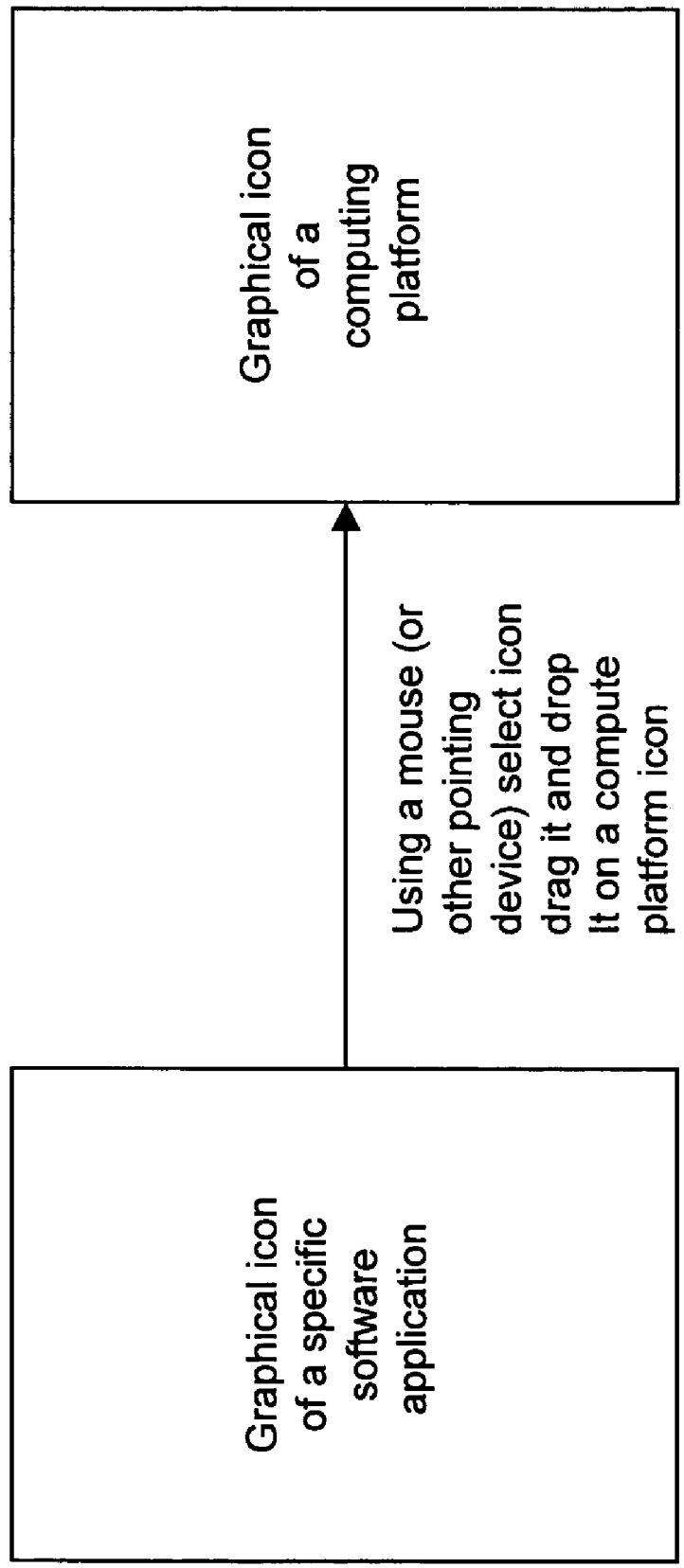
FIG. 12 is a schematic diagram showing the operation of the invention, according to an embodiment of the invention.

Referring to FIG. 12, shown is a schematic showing the operation of an aspect of the invention, according to an embodiment of the invention.

A graphical icon representing a specific software application is displayed through a graphical user interface. Also displayed is an icon representing a remote computing platform upon which a software application can be hosted. Only one computing platform icon is shown; however, it is to be understood that several computing platform icons each representing a respective remote or local computing platform may also be displayed. Similarly, several software application icons may be displayed depending on the number of software applications available. The software application is selected, through the use of a graphical user interface, by pointing to its software application icon and using a mouse click (or other pointing device). The software application icon is dragged over top of the remote computing platform icon and dropped. The drop initiates the operation of installing software applications on the remote computing platform.

Figure 13:
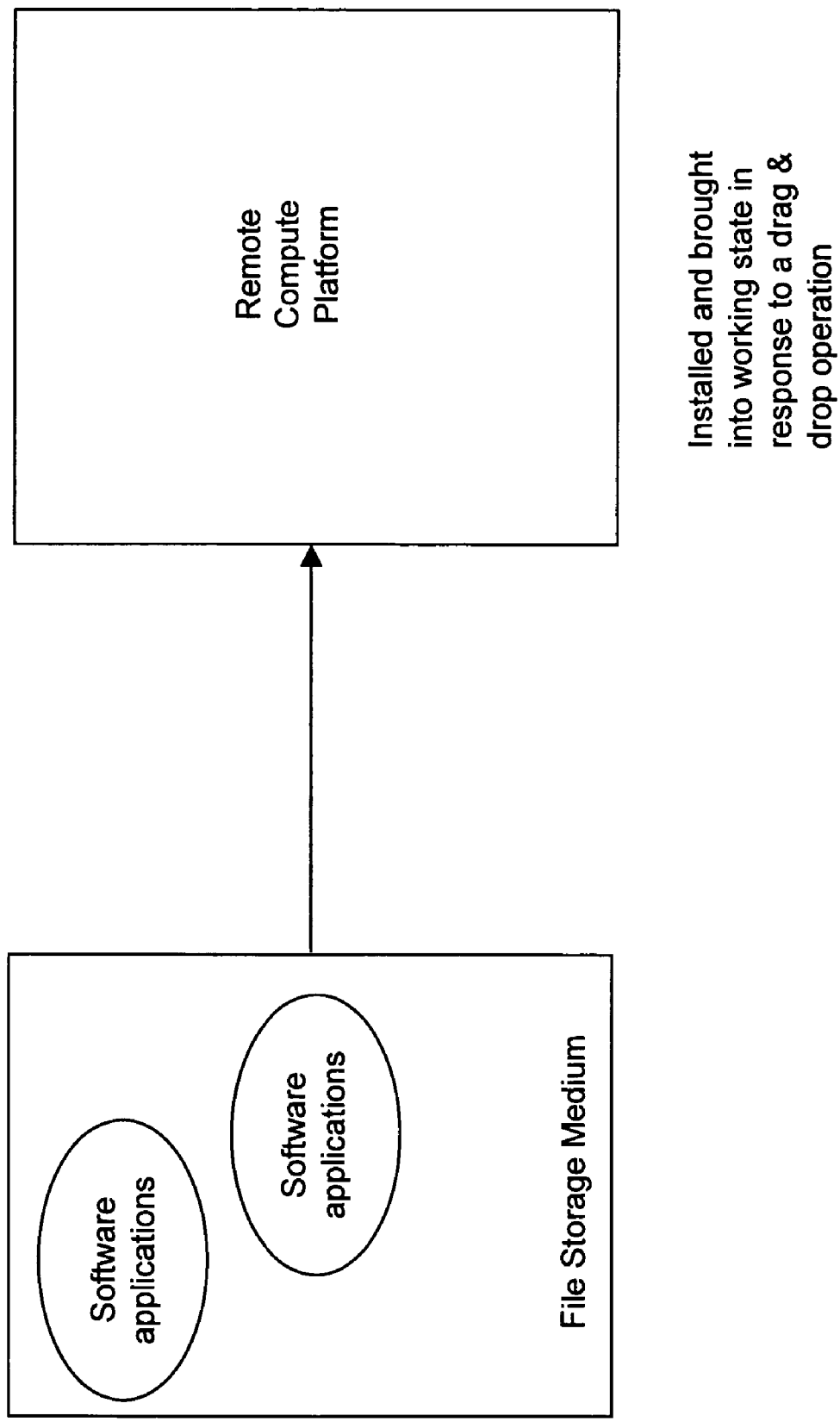
FIG. 13 is a schematic diagram showing software application icons collected in a centralized file storage medium and a remote computing platform icon, according to another embodiment of the invention.

Referring to FIG. 13, shown is a schematic diagram illustrating software application icons collected in a centralized file storage medium and a remote computing platform icon, according to another embodiment of the invention. The software applications icons collected in the file storage medium, as shown, are graphical icons each representing respective software applications, which are entries in the file storage medium. The computing platform icon represents a computing platform available to host any one or more of the software applications represented by the software icons. When one of the software application icons is selected, dragged, and dropped on a computing platform icon the respective software applications installed on the remote computing platform corresponding to the computing platform icon.

Figure 14:
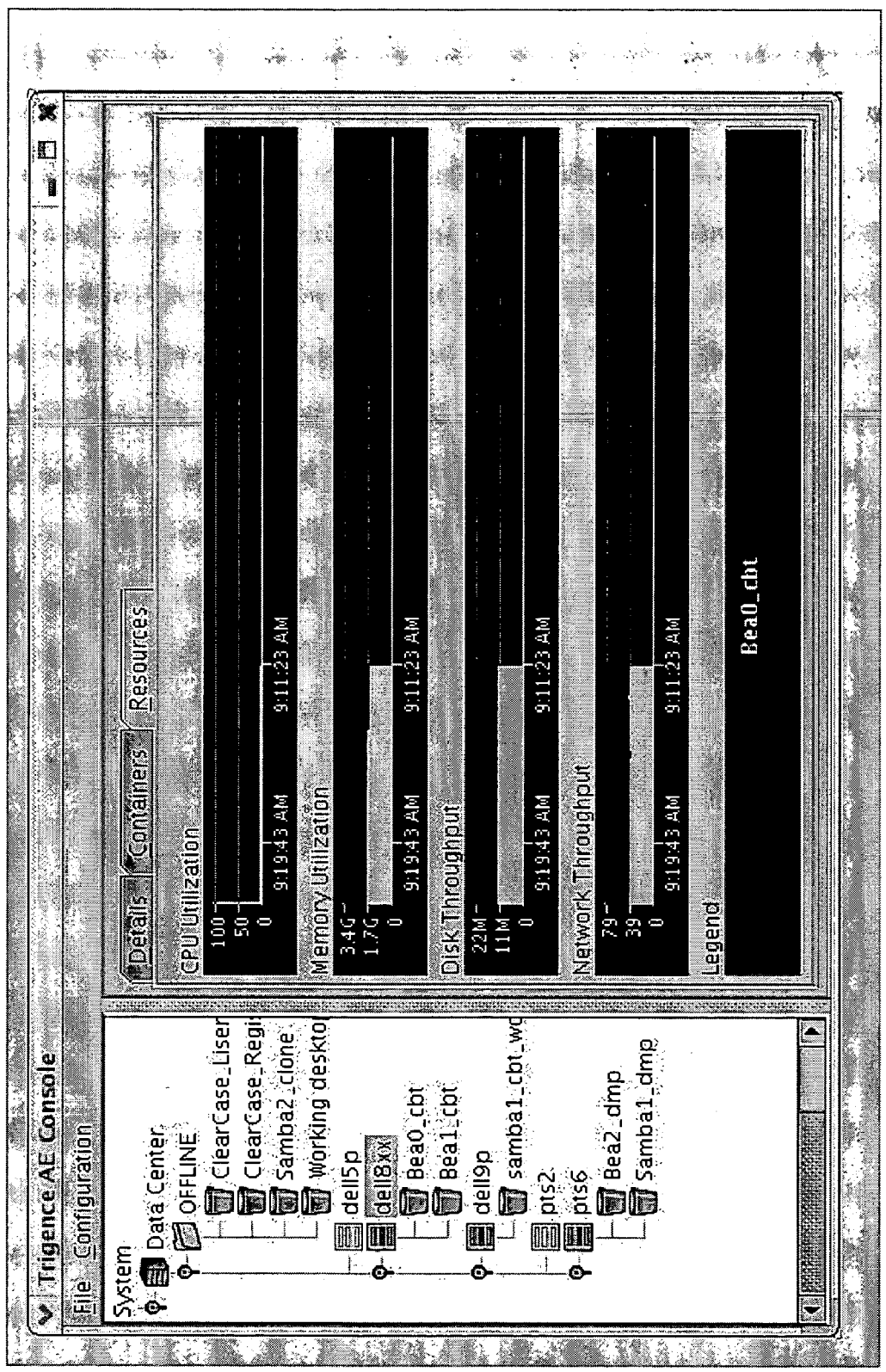
FIG. 14 is a screen snapshot of an implementation according to the schematic of FIG. 13.

Referring to FIG. 14, a screen snapshot of an implementation is shown according to the schematic of FIG. 13. The screen snap shot shows, as an example implementation, software application and computing platform icons. Available software applications corresponding to software application icons ClearCase_Liserver, ClearCase_Registry & Samba2_clone are grouped under the heading "OFFLINE". Computing platforms available to host software applications are featured under the heading "Data Center" and are represented by computing platform icons dell8xx, dell9p, pts2 & pts6.

Operations involve selecting a software application icon, dragging it over a candidate computing platform icon and releasing, or dropping it on the computing platform icon. The selected software application will then be installed in working order on the selected computing platform. The reverse is true for removal of a software application from a selected computing platform. De-installation is accomplished by selecting an application installed on a compute platform and dragging to the repository. The application in question is shown to be associated with a compute platform in graphical fashion. In one embodiment, as shown in FIG. 14, applications are associated with a compute platform in hierarchical order, or in a tree view. An application connected to a compute platform as root in a tree view is selected and dropped onto the repository. This initiates the de-install operation.

Figure 15:
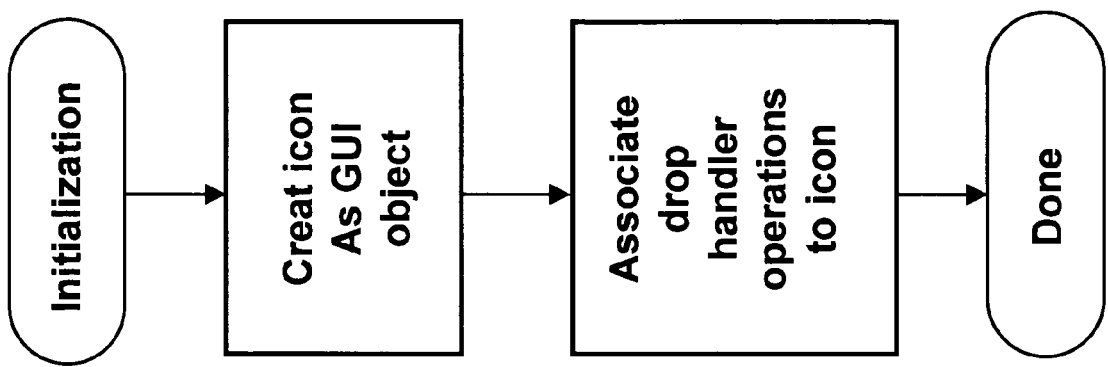
FIG. 15 is a flow chart of a method of initializing icons of FIG. 14.

Referring to FIG. 15, shown is a flow chart of a method of initializing the icons of FIG. 14. An icon such as a computing platform icon or software application icon is created as a GUI (Graphical User Interface) object. Drop handler operations are then associated to the computing platform icon. In particular, any operation required for installation is associated with the icon.

With reference to FIGS. 12 to 14, the installation process is initiated by a drag and drop of a software application icon, from a storage medium, to a top of a computing platform icon. An install drop handler implements the installation of the software application. The install drop handler performs several tasks on the destination computing platform, which:

Tests whether the computing platform is a valid computing platform;
Creates a user account for the software application;
Installs application specific files so that they are accessible to the remote computing platform;
Sets file access permissions such that a new user can access its applications;
Starts a first application; and
Updates a console showing that the selected software application is resident on the selected computing platform.

These steps will now be described with reference to FIG. 16 which is a flow chart of a method of installing a software application on a computing platform in response to the drag and drop operation of FIG. 2. As discussed above, in operation the installation process is invoked when a software application icon is dropped on a computing platform icon.

The method steps of FIG. 16 are performed by an install drop handler. During installation, verification is performed to determine whether the selected computing platform is a valid candidate for installing a selected software application. If the computing platform is a valid candidate, a user account is created for the software application; otherwise, the installation process ends. Once the user account is created, application files associated with the software applications are installed on the selected computing platform so that they are accessible to the computing platform. File access permissions are then set such that one or more new users can access the application being installed. A first application is then started. In some embodiments, an application, for example accounting or payroll represent several programs/processes. In order to start the accounting/payroll service a first application is started that may in turn start other programs/processes. The first program is started. It is then up to the specific service, accounting/payroll, to start any other services it requires.

A console on the selected computing platform on which the software application is being installed is then updated with information to show that the selected software application is resident on the selected computing platform. The console is operational on any desktop computing platform for example, Unix, Linux and Windows.

With reference to FIG. 17, the removal process is initiated by a drag and drop operation of a software application icon from a computing platform icon to the repository. For this purpose each computing platform icon shows, with the use of associated software application icons (not shown in FIG. 15), each application software installed on the computing platform.

The de-installation of application software from a selected computing platform is done by a remove drop handler which performs the following tasks on the selected computing platform:

Tests whether the computing platform is a valid computing platform; Tests are made to verify whether the computing platform is operational. For example, it may have been taken off-line due to a problem or routine maintenance. If so, then applications should not be removed or installed until this state changes.
Stops processes associated with the software application;
Copies application specific data file changes from the computing platform back to the storage medium;
Removes user accounts associated with the software application; and
Updates the console to show that the selected software application is resident in the repository.

These steps will now be described with reference to FIG. 17 which is a flow chart of a method of de-installing a software application from a computing platform in response to a drag and drop operation of FIG. 13. The state of the platform is verified to determine whether it is valid. The state includes, for example, on-line, off-line (a problem state) or maintenance (off-line, but for a scheduled task). If the state of the platform is valid and a process or processes associated with a software application selected to be de-installed are stopped; otherwise the de-installation process ends. Once the processes are stopped, application specific data file changes are copied from the computing platform back to the storage medium. This is a process of capturing changes that may have taken place while the application ran and that need to be saved for future instances when the application runs again. For example, payroll may be run every other week. Changes made to the system, accrued amounts, year to date payments, etc. will need to be saved so that when payroll is run the next time these values are updated. Depending on how the operator configures a system, it may be required to copy changes made when payroll ran back to the repository so that the next time payroll is run these values are installed along with the application.

Any user account associated with the selected software application is removed and a console on the computing platform from which the selected software application is being de-installed is updated with information to show that the selected software application is resident in the repository. Using the method steps of FIGS. 16 and 17, software applications are therefore installed on a computing platform and removed from the computing platform through a graphical user interface drag and drop operation.

A number of programming languages may be used to implement programs used in embodiments of the invention. Some example programming languages used in embodiments of the invention include, but are not limited to, C++, Java and a number of scripting languages including TCL/TK and PERL.

Installation of software applications is preferably performed on computing platforms that are remote from a console computing platform. However, some embodiments of the invention also have installation of software applications performed on a computing platform that is local to a console computing platform. Numerous modifications and variations of the present invention are possible in light of the above teachings. It is therefore to be understood that within the scope of the appended claims, the invention may be practiced otherwise than as specifically described herein.

What is claimed is:

1. In a system having a plurality of servers with operating systems that differ, operating in disparate computing environments, wherein each server includes a processor and an operating system including a kernel a set of associated local system files compatible with the processor, a method of providing at least some of the servers in the system with secure, executable, applications related to a service, wherein the applications are executed in a secure environment, wherein the applications each include an object executable by at least some of the different operating systems for performing a task related to the service, the method comprising:

storing in memory accessible to at least some of the servers a plurality of secure containers of application software, each container comprising one or more of the executable applications and a set of associated system files required to execute the one or more applications, for use with a local kernel residing permanently on one of the servers; wherein the set of associated system files are compatible with a local kernel of at least some of the plurality of different operating systems, the containers of application software excluding a kernel, wherein some or all of the associated system files within a container stored in memory are utilized in place of the associated local system files that remain resident on the server, wherein said associated system files utilized in place of the associated local system files are copies or modified copies of the associated local system files that remain resident on the server, and wherein the application software cannot be shared between the plurality of secure containers of application software, and wherein each of the containers has a unique root file system that is different from an operating system's root file system.

2. A method as defined in claim 1, wherein each container has an execution file associated therewith for starting the one or more applications.

3. A method as defined in claim 2, wherein the execution file includes instructions related to an order in which executable applications within will be executed.

4. A method as defined in claim 1 further comprising the step of pre-identifying applications and system files required for association with the one or more containers prior to said storing step.

5. A method as defined in claim 2, further comprising the step of modifying at least some of the associated system files in plural containers to provide an association with a container specific identity assigned to a particular container.

6. A method as defined in claim 2, comprising the step of assigning a unique associated identity to each of a plurality of the containers, wherein the identity includes at least one of IP address, host name, and MAC address.

7. A method as defined in claim 2 further comprising the step of modifying at least some of the system files to define container specific mount points associated with the container.

8. A method as defined in claim 1, wherein the one or more applications and associated system files are retrieved from a computer system having a plurality of secure containers.

9. A method as defined in claim 2, wherein server information related to hardware resource usage including at least one of CPU memory, network bandwidth, and disk allocation is associated with at least some of the containers prior to the applications within the containers being executed.

10. A method as defined in claim 2, wherein in operation when an application residing within a container is executed, said application has no access to system files or applications in other containers or to system files within the operating system during execution thereof.

11. A method as defined in claim 2, wherein containers include files stored in network file storage, and parameters forming descriptors of containers stored in a separate location.

12. A method as defined in claim 11, further comprising the step of merging the files stored in network storage with the parameters to affect the step of storing in claim 1.

13. A method as defined in claim 1 further comprising the step of associating with a plurality of containers a stored history of when processes related to applications within the container are executed for at least one of, tracking statistics, resource allocation, and for monitoring the status of the application.

14. A method as defined in claim 1 comprising the step of creating containers prior to said step of storing containers in memory, wherein containers are created by:
a) running an instance of a service on a server;
b) determining which files are being used; and,
c) copying applications and associated system files to memory without overwriting the associated system files so as to provide a second instance of the applications and associated system files.

15. A method as defined in claim 14 comprising the steps of:
assigning an identity to the containers including at least one of a unique IP address, a unique Mac address and an estimated resource allocation;
installing the container on a server; and,
testing the applications and files within the container.

16. A method as defined in claim 1 comprising the step of creating containers prior to said step of storing containers in memory, wherein a step of creating containers includes:
using a skeleton set of system files as a container starting point and installing applications into that set of files.

17. A method as defined in claim 1 further comprising installing a service on a target server selected from one of the plurality of servers, wherein installing the service includes:
using a graphical user interface, associating a unique icon representing a service with an unique icon representing a server for hosting applications related to the service and for executing the service, so as to cause the applications to be distributed to, and installed on the target server.

18. A method as defined in claim 17 wherein the target server and the graphical user interface are at remote locations.

19. A method as defined in claim 18, wherein the graphical user interface is installed on a computing platform, and wherein the computing platform is a different computing platform than the target server.

20. A method as defined in claim 19, wherein the step of associating includes the step of relatively moving the unique icon representing the service to the unique icon representing a server.

21. A method as defined in claim 20 further comprising starting a distributed software application.

22. A method according to anyone of claims 20 further comprising updating a console on the selected target server with information indicating that the service is resident on the selected target server.

23. A method claim 17, further comprising, the step of testing to determine if the selected target server is a valid computing platform, prior to causing the applications to be distributed to, and installed on the target server.

24. A method according to claim 17 further comprising creating a user account for the service.

25. A method as defined in claim 17, further comprising the step of installing files specific to the selected application on the selected server.

26. A method according to claim 17 further comprising the steps of setting file access permissions to allow a user to access the one of the applications to be distributed.

27. A method as defined in claim 1, further comprising de-installing a service from a server, comprising:
 displaying the icon representing the service;
 displaying the icon representing the server on which the service is installed;
 and utilizing the icon representing the service and the icon representing the server to initiating the de-installation of the selected service from the server on which it was installed.

28. A method according to claim 27 further comprising separating icon representing the service from the icon representing the server.

29. A method according to claim 27 further comprising testing whether the selected server is a valid computing platform for de-installation of the service.

30. A method according to claim 27 further comprising copying data file changes specific to the service back to a storage medium from which the data file changes originated prior to installation.

31. A computing system for performing a plurality of tasks each comprising a plurality of processes comprising:
 a system having a plurality of secure containers of associated files accessible to, and for execution on, one or more servers, each container being mutually exclusive of the other, such that read/write files within a container cannot be shared with other containers, each container of files is said to have its own unique identity associated therewith, said identity comprising at least one of an IP address, a host name, and a Mac_address; wherein, the plurality of files within each of the plurality of containers comprise one or more application programs including one or more processes, and associated system files for use in executing the one or more processes wherein the associated system files are files that are copies of files or modified copies of files that remain as part of the operating system, each container having its own execution file associated therewith for starting one or more applications, in operation, each container utilizing a kernel resident on the server and wherein each container exclusively uses a kernel in an underlying operation system in which it is running and is absent its own kernel; and,
 a run time module for monitoring system calls from applications associated with one or more containers and for providing control of the one or more applications.

32. A computing system as defined in claim 31, further comprising a scheduler comprising values related to an allotted time in which processes within a container may utilize predetermined resources.

33. A computing system as defined in claim 32, wherein the run time module includes an intercepting module associated with the plurality of containers for intercepting system calls from any of the plurality of containers and for providing values alternate to values the kernel would have assigned in response to the system calls, so that the containers can run independently of one another without contention, in a secure manner, the values corresponding to at least one of the IP address, the host name and the Mac_Address.

34. A computing system as defined in claim 31, wherein the run time module performs:
 monitoring resource usage of applications executing; intercepting system calls to kernel mode, made by the at least one respective application within a container, from user mode to kernel mode;
 comparing the monitored resource usage of the at least one respective application with the resource limits; and,
 forwarding the system calls to a kernel on the basis of the comparison between the monitored resource usage and the resource limits.

* * * * *